May 29, 1951  L. S. HARTLEY ET AL  2,554,982
WIRE LEAD DETECTOR
Filed May 28, 1949  2 Sheets-Sheet 2
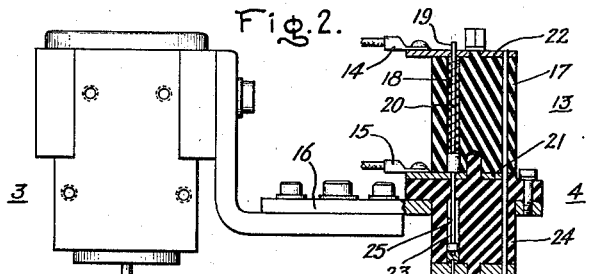
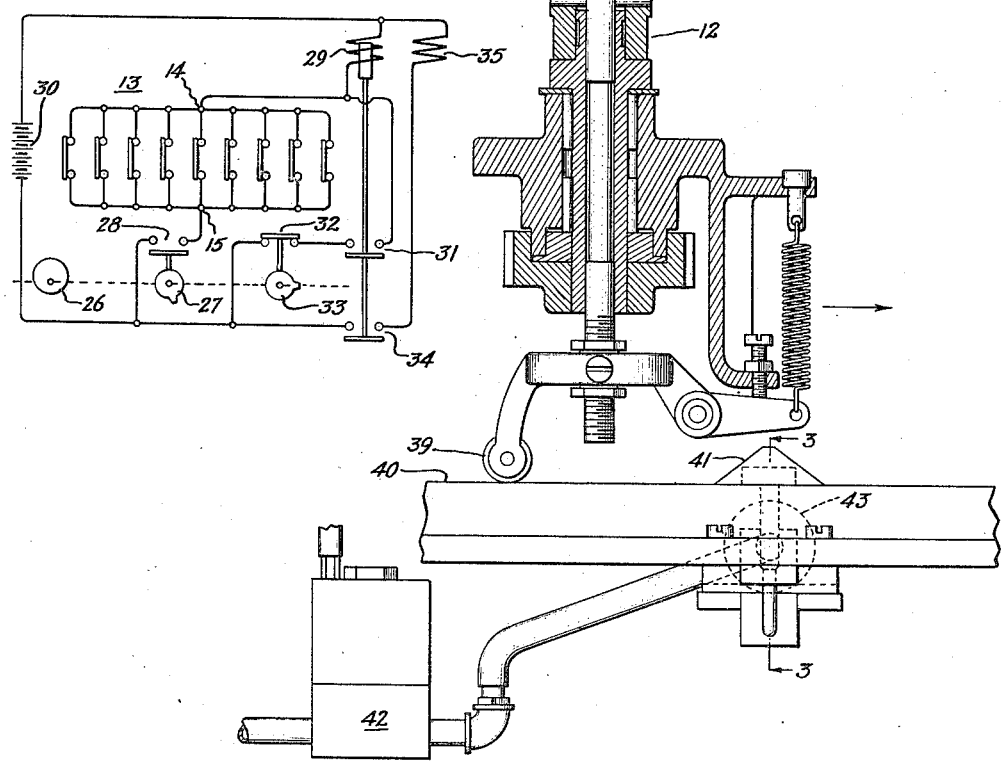
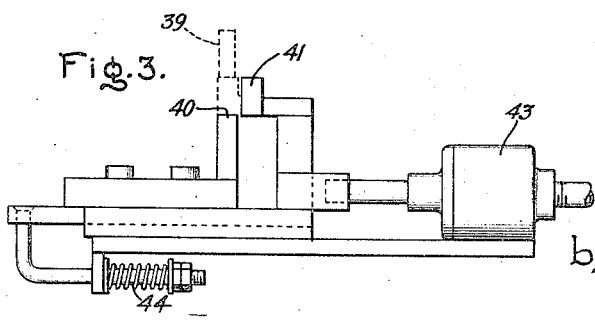
Inventors:
Lloyd S. Hartley,
Raymond A. Newton,
by Merton D. Moore
Their Attorney.

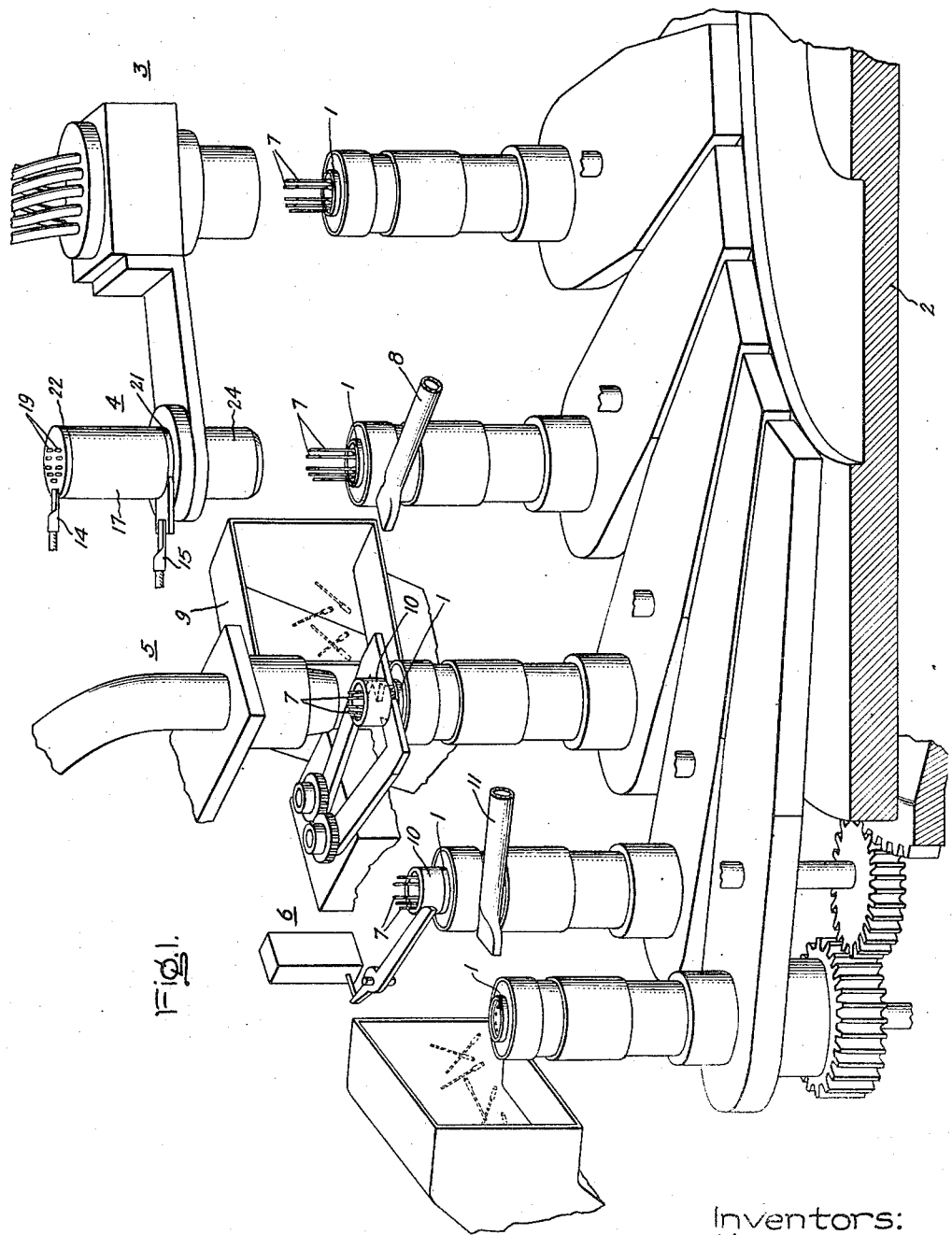

Patented May 29, 1951

2,554,982

UNITED STATES PATENT OFFICE 2,554,982

WIRE LEAD DETECTOR

Lloyd S. Hartley and Raymond A. Newton, Schenectady, N. Y., assignors to General Electric Company, a corporation of New York Application May 28, 1949, Serial No. 97,517

3 Claims. (Cl. 209—72)

This invention relates to automatic stem-making machines and has particular reference to an automatic lead detecting apparatus.

In making stems for electron discharge devices, multi-position rotary machines are usually employed completely to make a completed stem without human intervention. In stems of the type which have a glass button or disc through which a number of electrode leads are sealed, it is, of course, important that each of the required leads be present and correctly positioned. The incorrectly assembled stems are usually removed by a machine attendant before the stem is completely made, or else the machine output is inspected for defects after completion of the manufacturing process. Since the defective stems represent scrap material, it is far more economical to salvage the leads from incorrectly loaded assemblies before they are sealed in the glass stem. On the other hand, detection of faulty assembly by a machine attendant or testing the assembly by methods which do not afford simultaneous and positive indications of the correct loading of all the stem leads for any one unit are not suitable for mass production methods.

An object of our invention is to provide an improved detector for indicating the correct positioning of a plurality of electrode leads in the manufacture of stems for electron discharge devices.

Another object of our invention is to provide an automatic detecting and rejecting means for faulty electrode lead assemblies in a stem-making machine.

A feature of our invention is the use in apparatus of the type described of a detecting device comprising a plurality of circuit interrupters normally biased to a closed position which are caused to open by the ends of correctly positioned electrode leads at a stage in the manufacturing process following that where the leads are automatically loaded into a holder. When one or more of the leads are missing, too short, or bent, one or more of the corresponding circuit interrupters will remain in a closed position, thus closing a detector circuit which energizes a lead ejecting means in order that the leads may be conserved.

The features which we desire to protect herein are pointed out with particularity in the appended claims. The invention itself, together with further objects and advantages thereof, may best be understood by reference to the following description taken in connection with the drawings in which Fig. 1 is a perspective view of a portion of a stem-making machine embodying my invention; Fig. 2 is a detailed view of the lead detector station of the machine shown in Fig. 1; Fig. 3 is a view taken along section 3—3 of Fig. 2 and Fig. 4 is a circuit diagram for a lead detector embodying my invention.

Referring now to Fig. 1, a portion of an automatic stem-making machine is shown in which my lead detector is employed. In the type of machine partially illustrated, a plurality of identical stem holding fixtures 1 are mounted on the periphery of a rotary table 2, five of such fixtures being illustrated in Fig. 1. Spaced along the periphery are a number of work stations, each one being designed to perform automatically a step in forming the finished article, which in this case is a glass stem or button through which a required number of electrode leads are sealed. Five stations numbered 3 to 6 inclusively are illustrated in part to show the operation of the lead detector and ejection apparatus. At station 3 a plurality of electrode leads 7 are loaded into the fixture 1, the fixture being apertured to receive the ends of the leads and hold them upright in the required spaced relationship. The table 2 is then rotated or notched forward to the next position 4 where the lead detector descends on the protruding ends of leads 7 in order to provide a signal should the holder be incorrectly loaded, as may be the case when one or more leads are missing, too short, or bent out of line.

Between station 4 and station 5 is a lead ejection apparatus where the leads 7 are ejected by a mechanism controlled by the lead detector, the leads being removed with the aid of the air blow line 8 in case the signal from the lead detecting device indicates incorrect loading of leads in the stem holding fixture 1. The ejected leads are blown into a collector 9 when they are accumulated for subsequent use.

At the next station 5 a glass loader automatically positions a cylindrical glass sleeve 10 around the electrode leads in the holder and at station 6 a glass detector comprising a pivoted lever indicates whether a glass cylinder has been positioned. A second ejection apparatus is employed after station 6 where the leads are ejected by a mechanism controlled by glass detector stage, leads being removed with the aid of the air blow line 11 in case the position of the glass detecting lever indicates the glass was not loaded on the stem holding fixture 1. In either case the unloaded fixture will be notched through the remaining work stations of the stem making machine without wasting the electrode leads since they have been ejected before being subjected to further steps in the stem making process. As indicated, in the above description, it can be seen that the operation of the lead detector and ejection means is entirely automatic. While we have shown lead ejecting apparatus in conjunction with the glass detector as well as with the lead detector, the second lead ejector apparatus actuated by the glass detector is not necessarily employed in stem-making machinery embodying our invention.

In Fig. 2 details of the lead detector station 4 are shown together with a co-acting portion 12 of the rotating table 2 and a part of the lead loading station 3. The lead detector assembly 13 comprises a circuit interrupting device having a plurality of circuit interrupting means connected in parallel between terminals 14 and 15, which are connected to a signalling circuit as will be explained in a following paragraph. The detector assembly 13 is preferably supportably connected to the lead loader at station 3 by means of a bracket 16 in order that the detector may be lowered over the loaded lead holder 1 on the rotatable table 2 by the same cam actuated means used to lower the lead loader over the empty fixture at the preceding station.

In a lead detector assembly 13 constructed as shown in Fig. 2 a generally cylindrical housing 17 made of a suitable insulating material, such as hard rubber, is provided with a plurality of axial bores 18 corresponding in number and position to that of the leads in the stem to be made. In stems for miniature tubes, for example, seven upright leads are circularly arranged around the center of a glass disk, and the axial bores 18 are correspondingly arranged in a lead detector assembly for testing this type of stem. It is obvious that the detector may be arranged to indicate the correct number and position of any given number of spaced projections from a surface. In each bore 18 of the housing 17 conductive rod 19 is slidably positioned to provide a movable contact member which is suitably biased, as by a helical compression spring 20, against a conductive end plate 21 fastened to the lower end of the housing member 17, the end plate 21 bearing the lead detector terminal 15. The other terminal member 14 is connected to an upper conductive end plate 22 fastened to the housing 17 and having apertures aligned with the bores in the housing, to provide a slidable contact with each conducting rod 19 and thus close the circuit between terminals 14 and 15 through the plurality of conducting rods 19.

To enable operation of actuating means for individually opening each of the normally closed circuit interrupting devices thus formed, the lower conductive end plate 21 is also apertured to correspond with the axial bores in the housing 17, the apertures in the end plate being provided with a smaller dimension than the lower ends of the conductive rods 19 in order that the rods may not slide through the end plate. Actuating rods 23 are suitably made of an insulating material and are slidably positioned in a second housing member 24 adjacent the lower end plate 21 and suitably made of an insulating material having a plurality of axial bores 25 aligned with the bores 18 of the housing 17. The lower portions of each of the bores 25 have a smaller diameter than the actuating rods 23 to prevent them from sliding through the housing. To help guide the protruding ends of the leads 7 into the respective bores 25 of the lower housing member, the lower ends of the bores are preferably countersunk or otherwise enlarged. It is obvious that, without departing from the spirit of our invention, the actuating rods and housing therefore may be omitted from the lead detector assembly since the leads 7 may themselves be employed to actuate the circuit interrupting devices of the lead detector assembly, providing suitable insulating means are employed to prevent the leads 7 from providing a conductive path between the conductive end plate 21 and the conductive rods 19.

Referring now to the circuit diagram of the lead detector apparatus shown in Fig. 4, it may be seen that the slidable conductive rods 19 of the lead detector 13 form a plurality of movable contact members connected in parallel between terminals 14 and 15 of the lead detector 13. Also schematically shown in Fig. 4 is a cam 26, which cam is connected through a gear train (not shown) with the driving mechanism of the rotary table 2 and timed to actuate the mechanism for lowering the lead loader and lead detector of stations 3 and 4, respectively, over the corresponding fixtures of the rotary table 2 after the table has been moved or notched to an operating position. A second timed cam 27 on the same shaft with cam 26 is arranged to momentarily close a circuit interrupting device 28 when the lead detector has been lowered over the lead holder 9. The circuit interrupting device 28 and a holding relay actuating coil 29 are connected in series with the lead detector 13 across a suitable source of voltage, represented conventionally as a battery 30. Hence at the time the circuit interrupting device 28 is closed, a voltage will be impressed across the terminals of the actuating coil 29 if one or more of the conducting rods 19 of the lead detector remain in the normally closed position.

As may be seen from Fig. 2, the projecting ends of the loaded leads 7 individually displace each of the actuating rods 23 and hence displace the respective conductive rods 19 to open the circuits between lead detector terminals 14 and 15 when the lead detector assembly is lowered over the ends of a correctly loaded holder 1. However, if any of the leads 7 are not present or if any of them are too short or bent out of line, one or more of the conductive rods will not be displaced with the result that current flows between lead detector terminals 14 and 15 and energizes the actuating coil 29 of the relay, closing the relay contacts. As shown in Fig. 4 the holding relay is sealed in the energized position through one of its own contacts 31 connected to the voltage source 30 through a second cam-operated circuit interrupting device 32. The circuit interrupting device 32 is actuated by a timed clearing cam 33, which is on the same shaft with cams 26 and 27 and is designed to open the circuit interrupting device 32 at a given time after the operation of cam 27 in order to deenergize the holding relay and restore the circuit to its previous condition so that the leads 7 in the next fixture on the rotary table may be tested. Before the holding relay circuit is opened by operation of the clearing cam 33 however, a second contact 34 of the holding relay in series with a solenoid valve actuating coil 35 is employed to place the voltage source 30 across the valve actuating coil for operating the lead ejection means.

Referring again to Fig. 2, a part of the rotary table 2, which has been notched to the operating position at the lead detecting station 4, is designated by the numeral 12. A vertical ejection plunger 36 is slidably mounted in the table structure under the lead-holding fixture 1 and has an enlarged upper portion 37 carrying a plurality of ejection pins 38 adapted to be moved upward through the holder fixture 1 to eject the loaded leads therefrom. The lower end of the ejection plunger is suitably terminated as by a bearing wheel 39 so that it may ride on a stationary track 40 positioned around the stem-making machine below the periphery of the rotary table 2. After the operation of the lead detector apparatus at station 4, the rotary table is moved or notched to the next work position and the portion 12 of the table shown in Fig. 2 moves to the right, the bearing wheel 39 on the ejection plunger riding on the stationary track 40 to the next position. A similar ejection mechanism is provided under each holding fixture 1 of the rotary table 2.

If the lead detector apparatus has operated as explained in conjunction with Fig. 4 to indicate a defectively loaded lead holder, a cam surface 41, which is, in effect, a slidable hump in the track 40, is moved into the path of the ejection plunger bearing wheel 39. This is suitably accomplished by opening a solenoid valve 42 by energizing its actuating coil 35 as previously explained to admit air to an air cylinder 43 whose piston is coupled to the cam surface 41. The cam surface 41 is accordingly displaced to move it to the reject position, as may be better seen by reference to Fig. 3, which is a view along line 3—3 of the track 40 and associated mechanism shown in Fig. 2. When the solenoid valve is closed after the operation of the clearing cam 33, the pressure in the air cylinder 43 collapses and the cam is returned to its original position by any suitable biasing means, such as a spring 44 as shown in Fig. 3.

In operation of a stem machine incorporating our lead detector, the ejection means will not be operated if the leads are found to be correctly loaded by operation of the lead detector at station 4. If through incorrect loading of the fixture 1 any of the conductive rods 19 of the lead detector are not upwardly displaced to open the circuit between the terminals 14 and 15 of the lead detector, the ejection means, which may suitably comprise the solenoid valve and associated apparatus employed in the specific construction described, operates to eject the incorrectly loaded leads while the rotary table is moving to another position. As shown in Fig. 1 the ejected leads are collected in condition to be used again after inspection for defects. While we have shown our lead detecting apparatus in conjunction with apparatus at station 6 for detecting the correct loading of a glass member used to form the disk or button part of the stem, since it is not desirable to subject the leads, even though correctly loaded, to further operations of the stem machine if the glass is not present, it is obvious that, without departing from the spirit of our invention, the lead detecting device may be used either separately or in conjunction with the glass detecting means as desired depending upon the type of installation and the type of stem or other assembly to be tested for correct loading of the projecting members.

While the present invention has been described by reference to particular embodiments thereof, it will be understood that numerous modifications may be made by those skilled in the art without actually departing from the invention. We, therefore, aim in the appended claims to cover all such equivalent variations as come within the true spirit and scope of the foregoing disclosure.

What we claim as new and desire to secure by Letters Patent of the United States is:

1. In combination, a holder apertured to receive one end of each of a plurality of rigid electrode leads and maintain them in a spaced relation, means for detecting incomplete loading of said holder comprising a plurality of circuit interrupting devices, said devices having terminals connected in parallel, said circuit interrupting devices normally being biased to a closed position, means for positioning each of the other ends of said plurality of leads opposite a corresponding one of said plurality of circuit interrupting devices, means for moving said devices against said other ends of said leads to open individually each of said corresponding circuit interrupting devices thereby, means for applying a voltage across the terminals of said circuit interrupting devices, and current responsive detecting means connected in series with said voltage applying means responsive to current flow when any of said circuit interrupting devices remain in a closed position.

2. In a stem forming machine, a fixture plurally apertured to hold the lower ends of each of a plurality of spaced electrode leads loaded therein, means for detecting incomplete loading of said fixture comprising a plurality of circuit interrupting devices having common terminals, said devices normally being biased to a closed position, means for positioning each of the upper ends of said plurality of leads loaded in said fixture opposite a corresponding one of each of said plurality of circuit interrupting devices in order to open individually each of said circuit interrupting devices thereby, means for applying a source of voltage across the terminals of said devices when said devices are positioned against said leads, and a current responsive detecting means connected in series with said voltage source operable by current flow when any of said circuit interrupting devices remains in a closed position, and ejection means responsive to the operation of said detecting means for removing said leads from said fixture.

3. Means for detecting the incomplete loading of a definite plurality of rod-like members in a spaced relationship in a holder comprising an assembly having a corresponding plurality of circuit interrupting devices each having an actuating means arranged in a spaced relationship corresponding to that of said members, said circuit interrupting devices being individually biased to a closed position and adapted to be opened by said members when positioned against the ends thereof, a source of voltage connected across the terminals of said circuit interrupting devices, and current responsive means connected in series with said voltage source.

LLOYD S. HARTLEY.
RAYMOND A. NEWTON.

REFERENCES CITED

The following references are of record in the file of this patent:

UNITED STATES PATENTS

| Number | Name | Date |
|---|---|---|
| 1,990,258 | Trutner | Feb. 5, 1935 |
| 2,054,627 | Hofmann et al. | Sept. 15, 1936 |